May 24, 1966   F. G. REUTER ETAL   3,252,208
METHOD OF MAKING A RAIL VEHICLE WHEEL
Original Filed Feb. 21, 1958
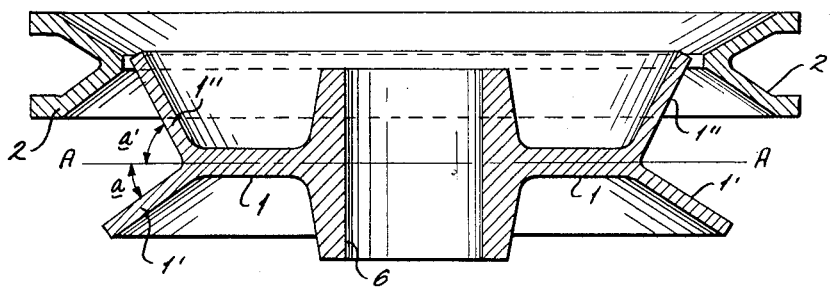
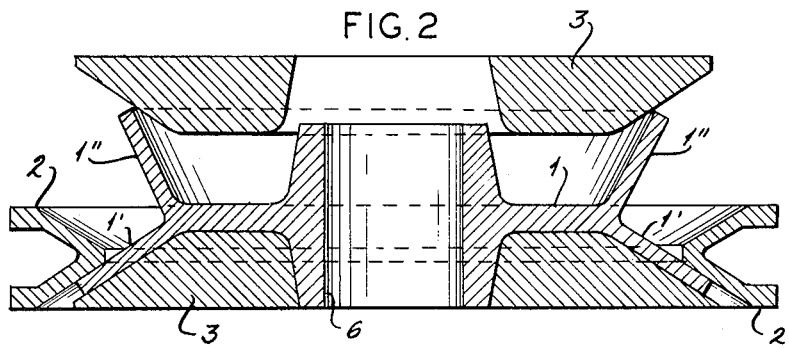
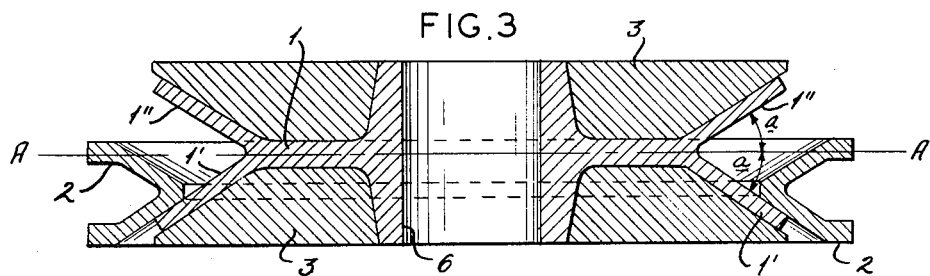
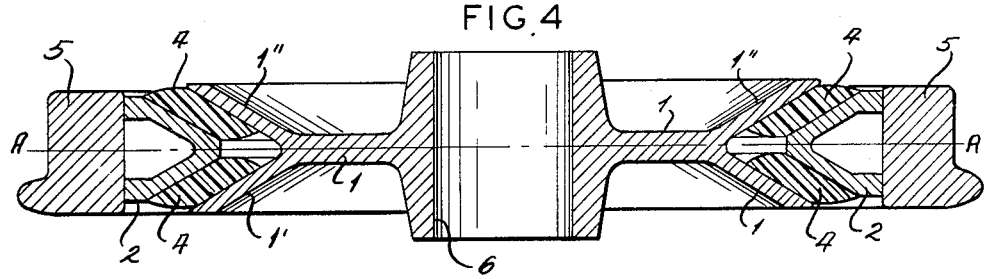
INVENTOR:
Franz Gottfried Reuter
Robert Igelbrinck
By [signature]
ATTORNEY.

United States Patent Office 3,252,208
Patented May 24, 1966

3,252,208
METHOD OF MAKING A RAIL VEHICLE WHEEL
Franz G. Reuter, Lemforde, Hannover, and Robert Igelbrinck, Voxtrup, near Osnabruck, Germany, assignors, by mesne assignments, to Mobay Chemical Company, Pittsburgh, Pa., a corporation of Delaware
Original application Feb. 21, 1958, Ser. No. 716,674, now Patent No. 2,999,717, dated Sept. 12, 1961. Divided and this application July 19, 1961, Ser. No. 150,606
Claims priority, application Germany Feb. 25, 1957
2 Claims. (Cl. 29—159.01)
(Filed under Rule 47(a) and 35 U.S.C. 116)

This is a division of U.S. application Serial No. 716,674 filed February 21, 1958 now Patent 2,999,717.

This invention relates generally to disc wheels for vehicles and more particularly to disc wheels for rail vehicles and to a method for making the same.

The heretofore available disc wheels for rail cars and the like have a separate wheel disc in the form of a circular flange welded to the hub body or such wheels have a V-shaped felly. It has been necessary to provide a split felly for such wheels and to later weld the two parts together. The resulting wheel having the riveted or welded joints has not been entirely satisfactory because the welded joints are not as strong as a one-piece felly would be. The wheel therefore cannot withstand the fatiguing loads required of them for an extended period of time.

It is, therefore, an object of this invention to provide an improved disc wheel for rail vehicles. Another object of the invention is to provide a method for making a disc wheel having a one-piece felly. Still another object of the invention is to provide a disc wheel of novel construction having improved fatigue characteristics and capable of withstanding the loads encountered in rail transportation.

Other objects will become apparent from the following description with reference to the accompanying drawing in which FIGURE 1 is a plan view, partially in section, of the parts used to prepare an embodiment of this invention; and FIGURE 2 is a section showing the parts of the embodiment of FIGURE 1 in partially assembled position; and FIGURE 3 is another sectional view of the parts assembled together just prior to casting of a synthetic resin insert; and FIGURE 4 is a sectional view of one-half of the wheel provided by this invention.

Generally speaking, the foregoing objects as well as others are accomplished in accordance with this invention by providing a disc wheel assembled from a wheel body and a one-piece felly. The felly is held in position with a synthetic resin insert cast thereabout. More specifically, the invention provides a method for making a wheel for vehicles having a one-piece felly and a flexible polyurethane resin insert about the felly.

Referring now to the drawing, FIGURE 1 illustrates a disc wheel body as it appears after it has been formed by rolling or pressing. The left leg 1' of the V-shaped rim of body 1 has been shaped to have the correct angle alpha. The right leg 1", however, does not slope from the center at the angle desired in the finished product. The angle alpha is greater than it will be in the finished product and leg 1" does not extend as high as leg 1'. As shown in FIGURE 1, leg 1" is at such a height that felly 2 can slide over it and into the V of the rim between legs 1' and 1". After the felly 2 has been passed over leg 1", leg 1' is pressed inwardly by means of a die towards the plane A—A as shown in FIGURE 2. The felly may be heated and hot pressed, if necessary. Leg 1' is supported by means of a die as leg 1" is moved inwardly to the correct angle by means of die 3.

FIGURE 3 illustrates the die-forming operation with leg 1" joined to the correct angle alpha.

After the felly 2 has been moved into the proper position between legs 1' and 1", a supporting plastic insert is cast about felly 2 and in between legs 1' and 1". This is done with the assembly in a horizontal position. This plastic insert is a cast substantially non-porous rubber-like polyurethane plastic. In casting the insert about felly 2, felly 2 is moved horizontally towards either leg 1' or leg 1" so that the plane thereof is not coplanar with the plane A—A of the wheel body. The cavity lying between felly 2 and the leg farthest away from it is then filled with substantially non-porous rubber-like polyurethane plastic. The proper position of felly 2 for this step is shown in FIGURE 3. The wheel is now turned over and while in a horizontal position, felly 2 is moved as far as it can be towards that leg of felly 2 adjacent the polyurethane insert. This compresses the insert. While the felly is in this position, a second polyurethane insert is cast on the upper side of felly 2, thereby providing an insert on each side of felly 2 between legs 1' and legs 1". The plastic is then permitted to cure or age and the finished wheel is obtained by inserting the wheel body and felly 2 in a suitable rim. One-half of a finished wheel is illustrated in FIGURE 4. This wheel has hub 6, body 1 with legs 1' and 1" containing polyurethane inserts 4 and felly 2. Rim 5 rests on the upper surfaces of felly 2.

The two inserts 4 are exercising substantially the same force against felly 2 and thereby hold it in a centered position between legs 1' and 1". The felly carries wheel rim 5. The resulting wheel has an extremely high side stability as a result of the V profile of the felly extending between the two legs 1' and 1".

The wheel body and felly may be shaped from any suitable material. It is preferred, however, to use iron castings.

The plastic inserts are cast substantially non-porous rubber-like polyurethane. Any suitable polyurethane of this type may be used including those disclosed in U.S. Patents 2,729,618, 2,621,166 and 2,620,516. Any of the various organic polyisocyanate and organic compounds having hydrogen atoms reactive with NCO groups may be used in preparing the polyurethane. Any of the cross-linkers disclosed in these patents including ethylene glycol, diethylene glycol, propylene glycol or the like may be used. Examples of suitable organic polyisocyanate include toluylene diisocyanate, p-phenylene diisocyanate, 1,5 naphthylene diisocyanate and the like. Suitable organic compounds having reactive hydrogen atoms include polyesters having terminal hydroxyl groups prepared by esterification of a dicarboxylic acid and a glycol, a polyalkylene ether glycol prepared by condensation of an alkylene oxide such as for example, ethylene oxide, propylene oxide, butylene oxide or the like. The polyurethanes prepared in accordance with the examples of the aforesaid patents or the examples for making substantially non-porous polyurethanes in U.S. Patent 2,764,565 may be used. The polyurethane is cast about the felly by pouring it into the cavity between the felly and the leg of the wheel body and may be cured by heating at a temperature of about 100° C. or higher for up to 24 hours.

Preferably, the polyurethane must have a shore A hardness of from about 50 to about 75° and an elasticity of from about 35% to about 65%.

Although the invention has been described in considerable detail in the foregoing for the purpose of illustration it is to be understood that such detail is solely for this purpose and that variations can be made therein by those skilled in the art without departing from the spirit and scope of the invention except as is set forth in the claims.

What is claimed is:

1. A method of making a rail vehicle wheel which comprises providing a one-piece hub and body, said body having a substantially V-shaped edge spaced from said hub having an open radially outer end formed by two legs, one of said legs forming an angle with the plane of the wheel greater than the angle of a finished wheel and the other leg forming a lesser angle with the plane of the finished wheel, positioning a one-piece open V-shaped felly having a diameter greater than the outer edge of said one leg within said V-shaped edge of said body by moving said felly over the leg disposed at the greater angle, pressing the leg disposed at the greater angle toward the plane of the wheel to the position of the finished wheel and casting polyurethane plastic between said felly and said two legs.

2. A method of making a rail vehicle wheel which comprises providing a one-piece hub and body, said body having a substantially V-shaped edge spaced from said hub having an open radially outer end formed by two legs, one of said legs forming an angle with the plane of the wheel greater than the angle of a finished wheel and the other leg forming a lesser angle with the plane of the finished wheel, positioning a one-piece open V-shaped felly having a diameter greater than the outer edge of said one leg within said V-shaped edge of said body by moving said felly over the leg disposed at the greater angle, pressing the leg disposed at the greater angle toward the plane of the wheel to the position of the finished wheel, moving said felly toward one of said legs, casting polyurethane plastic into the space formed between the other of said legs and said felly, moving the felly against the resulting casting and casting a second polyurethane insert on the opposite side of the felly thereby positioning the felly in a position coplanar with the wheel.

References Cited by the Examiner

UNITED STATES PATENTS

| | | | |
|---|---|---|---|
| 294,461 | 3/1884 | Gendron | 29—159.1 X |
| 2,895,175 | 7/1959 | Reuter et al. | 295—11 |
| 2,898,142 | 8/1959 | Kordes | 29—159 |
| 2,954,259 | 9/1960 | Kordes | 295—11 |

JOHN F. CAMPBELL, *Primary Examiner.*

NEDWIN BERGER, *Examiner.*

S. C. KAHLER, *Assistant Examiner.*